(12) United States Patent
Hikita

(10) Patent No.: US 8,988,528 B2
(45) Date of Patent: Mar. 24, 2015

(54) VIDEO PROCESSING DEVICE, VIDEO PROCESSING METHOD, AND PROGRAM

(75) Inventor: Jun Hikita, Kanagawa (JP)

(73) Assignee: Sony Corporation (JP)

( * ) Notice: Subject to any disclaimer, the term of this patent is extended or adjusted under 35 U.S.C. 154(b) by 1027 days.

(21) Appl. No.: 12/657,812

(22) Filed: Jan. 28, 2010

(65) Prior Publication Data

US 2010/0194891 A1 Aug. 5, 2010

(30) Foreign Application Priority Data

Feb. 4, 2009 (JP) ................................ P2009-024301

(51) Int. Cl.
*H04N 7/18* (2006.01)
*G11B 27/034* (2006.01)
*A63B 24/00* (2006.01)
*G11B 27/10* (2006.01)
*G11B 27/28* (2006.01)
(Continued)

(52) U.S. Cl.
CPC .......... *G11B 27/034* (2013.01); *A63B 24/0021* (2013.01); *G11B 27/105* (2013.01); *G11B 27/28* (2013.01); *G11B 27/322* (2013.01); *H04N 5/262* (2013.01); *H04N 7/17309* (2013.01); *H04N 21/21805* (2013.01); *H04N 21/2365* (2013.01); *H04N 21/45455* (2013.01); *H04N 21/47202* (2013.01); *H04N 21/4722* (2013.01); *H04N 21/8405* (2013.01); *H04N 21/8456* (2013.01); *H04N 21/8545* (2013.01);
(Continued)

(58) Field of Classification Search
CPC ................. A63B 2220/806; A63B 2024/0025; A63F 2300/063

USPC .................................. 348/157–169; 345/473
See application file for complete search history.

(56) References Cited

U.S. PATENT DOCUMENTS 6,144,375 A * 11/2000 Jain et al. ...................... 715/251
6,378,132 B1 * 4/2002 Grandin et al. ............... 725/146
(Continued)

FOREIGN PATENT DOCUMENTS

JP 2003250141 A 9/2003
JP 2003333570 A 11/2003
(Continued)

OTHER PUBLICATIONS

Office Action from Japanese Application No. 2009-024301, dated Jan. 25, 2011.
(Continued)

*Primary Examiner* — Tung Vo
*Assistant Examiner* — Rowina Cattungal
(74) *Attorney, Agent, or Firm* — Lerner, David, Littenberg, Krumholz & Mentlik, LLP

(57) ABSTRACT

A video processing device includes a video obtaining unit configured to obtain video data by capturing video of a specific area, a video accumulating unit configured to accumulate the video data obtained by the video obtaining unit, a data input unit configured to input event occurrence data indicating an event that has occurred in a video image corresponding to the video data obtained by the video obtaining unit and object specifying data for specifying an object relating to the event, and an addition processing unit configured to add the event occurrence data and object specifying data input by the data input unit to the video data accumulated in the video accumulating unit using a predetermined format through provision of link data for linking the video data to the event occurrence data and the object specifying data.

3 Claims, 18 Drawing Sheets

(51) Int. Cl.
   G11B 27/32      (2006.01)
   H04N 5/262      (2006.01)
   H04N 7/173      (2011.01)
   H04N 21/218     (2011.01)
   H04N 21/2365    (2011.01)
   H04N 21/4545    (2011.01)
   H04N 21/472     (2011.01)
   H04N 21/4722    (2011.01)
   H04N 21/8405    (2011.01)
   H04N 21/845     (2011.01)
   H04N 21/8545    (2011.01)
   H04N 21/8549    (2011.01)

(52) U.S. Cl.
   CPC ... *H04N 21/8549* (2013.01); *A63B 2024/0025* (2013.01); *A63B 2024/0056* (2013.01); *A63B 2220/806* (2013.01)
   USPC ....................................................... 348/157

(56) References Cited

U.S. PATENT DOCUMENTS

| | | | | |
|---|---|---|---|---|
| 7,230,653 | B1* | 6/2007 | Overton et al. | 348/584 |
| 7,979,877 | B2* | 7/2011 | Huber et al. | 725/36 |
| 2003/0142238 | A1* | 7/2003 | Wasack et al. | 348/571 |
| 2007/0002039 | A1 | 1/2007 | Pendleton et al. | |
| 2007/0139416 | A1* | 6/2007 | Azuma | 345/473 |
| 2009/0262137 | A1* | 10/2009 | Walker et al. | 345/629 |
| 2010/0123830 | A1* | 5/2010 | Vunic | 348/700 |
| 2011/0231428 | A1* | 9/2011 | Kuramura | 707/769 |

FOREIGN PATENT DOCUMENTS

| | | |
|---|---|---|
| JP | 2006312088 A | 11/2006 |
| JP | 2007-102503 A | 4/2007 |
| JP | 2008211796 A | 9/2008 |
| WO | 9510915 A1 | 4/1995 |
| WO | 0010075 A1 | 2/2000 |
| WO | 0178050 A2 | 10/2001 |
| WO | 02071334 A2 | 9/2002 |
| WO | 20040032516 A2 | 4/2004 |

OTHER PUBLICATIONS

European Search Report EP 10151854, dated Jul. 2, 2010.
Office Action from Japanese Application No. 2009-024301, dated Nov. 9, 2010.

* cited by examiner

| Header |
|---|
| Body |
| Trailer |

FIG. 10

| offset | +0h | +1h | +2h | +3h |
|---|---|---|---|---|
| 0  +0h | Format Type | Format Version | Frame Rate | Resolution |
| 4  +4h | Competition ID | | | |
| 8  +8h | Match ID | | | |
| 12 +Ch | Home Team ID | | | |
| 16 +10h | Away Team ID | | | |
| 20 +14h | Number of Players | Field Size (X) | Field Size (Y) | (RESERVED) |
| 24 +18h | 1st Half Start UTC | | | |
| 36 +24h | 1st Half End UTC | | | |
| 48 +30h | 2nd Half Start UTC | | | |
| 60 +3Ch | 2nd Half End UTC | | | |
| 72 +48h | Extra Time 1st Half Start UTC | | | |
| 84 +54h | Extra Time 1st Half End UTC | | | |
| 96 +60h | Extra Time 2nd Half Start UTC | | | |
| 108 +6Ch | Extra Time 2nd Half End UTC | | | |
| 120 +78h | PK Start UTC | | | |
| 132 +84h | PK End UTC | | | |
| 144 +90h | Game Suspend UTC | | | |
| 156 +9Ch | Game Resume UTC | | | |
| 168 +A8h | Tracking Start UTC | | | |
| 180 +B4h | Tracking End UTC | | | |
| 192 +C0h | | | | |

UTC_type

| offset | +0h | +1h | +2h | +3h |
|---|---|---|---|---|
| 0 +0h | yyyy | | mm | dd |
| 4 +4h | HH | MM | ss | (RESERVED) |
| 8 +8h | fff | | (RESERVED) | |

FIG. 11

|   |      | +0h | +1h | +2h | +3h |
|---|------|-----|-----|-----|-----|
| 0 | +0h  | colspan=4: UTC |||| 
| 12 | +Ch  | colspan=4: Frame Number ||||
| 16 | +10h | colspan=4: Ball Position x ||||
| 20 | +14h | colspan=4: Ball Position y ||||
| 24 | +18h | colspan=4: Ball Position z ||||
| 28 | +1Ch | colspan=4: (RESERVED) ||||
| 32 | +20h | | | | |

FIG. 12

|    |      | +0h | +1h | +2h | +3h |
|----|------|-----|-----|-----|-----|
| 0  | +0h  | colspan=4: Player ID ||||
| 4  | +4h  | Team/Referee ID | Shirt No. | colspan=2: (RESERVED) ||
| 8  | +8h  | colspan=4: Player Position x ||||
| 12 | +Ch  | colspan=4: Player Position y ||||
| 16 | +10h | colspan=4: Player Position z ||||
| 20 | +14h | colspan=4: Player Facing x ||||
| 24 | +18h | colspan=4: Player Facing y ||||
| 28 | +1Ch | colspan=4: Player Facing z ||||
| 32 | +20h | colspan=4: Phase for Vertical Oscillation ||||
| 36 | +24h | colspan=4: Phase for Leg Motion ||||
| 40 | +28h | colspan=4: (RESERVED) ||||
| 44 | +2Ch | colspan=4: (RESERVED) ||||
| 48 | +30h | | | | |

|  | +0h | +1h | +2h | +3h |
|---|---|---|---|---|
| 0 +0h | | UTC | | |
| 12 +Ch | | Frame Number | | |
| 16 +10h | | Player ID | | |
| 20 +14h | | Team ID | | |
| 24 +18h | | Uniform Number | | |
| 28 +1Ch | | (RESERVED) | | |
| 32 +20h | | Event_data | | |
| 48 +30h | | | | |

SFMM_event_type

|  | +0h | +1h | +2h | +3h |
|---|---|---|---|---|
| 0 +0h | General | detail-1 | detail-2 | detail-3 |
| 4 +4h | detail-4 | detail-5 | detail-6 | detail-7 |
| 8 +8h | detail-8 | detail-9 | | |
| 12 +Ch | | | (RESERVED) | Record Flag |

|  | +0h | +1h | +2h | +3h |
|---|---|---|---|---|
| 0 +0h | | Total Number of Events/Frames | | |
| 4 +4h | Finish Flag | (RESERVED) | | |

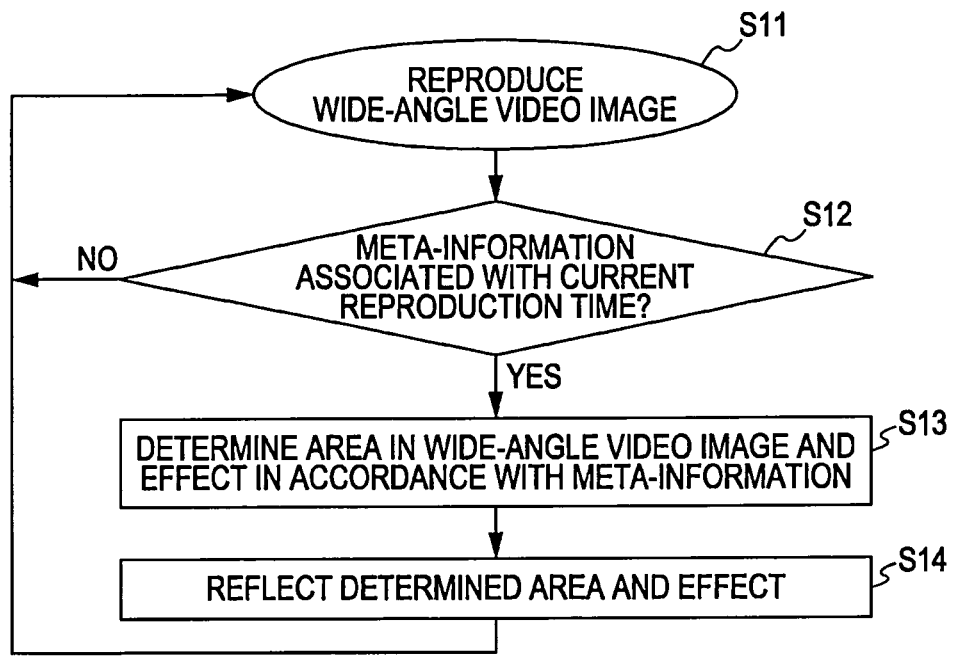
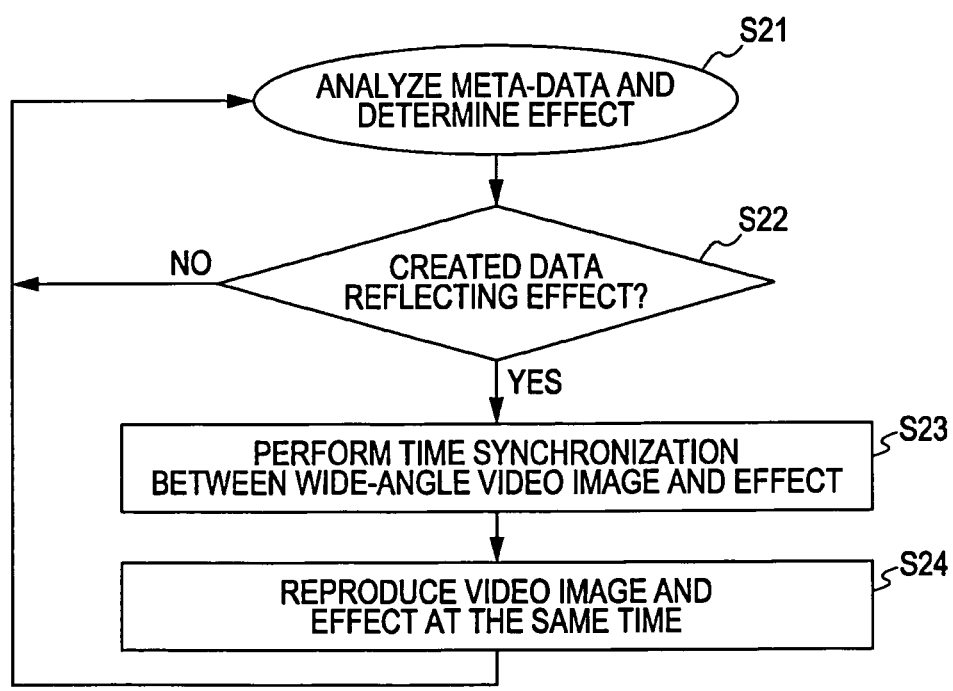

Frame   pos      condition
10001   35x45    –
10002   36x46    10 Touch
10003   37x48    10 Pass

DIRECT SHOT-ON-GOAL AREA

PASS AREA

VIDEO PROCESSING DEVICE, VIDEO PROCESSING METHOD, AND PROGRAM

CROSS-REFERENCE TO RELATED APPLICATION

The present application claims priority from Japanese Patent Application No. JP 2009-024301 filed in the Japanese Patent Office on Feb. 4, 2009, the entire content of which is incorporated herein by reference.

BACKGROUND OF THE INVENTION

1. Field of the Invention

The present invention relates to a video processing device and method suitable for processing video of, for example, a recorded sports game, and to a program using the method.

2. Description of the Related Art

When a live broadcast game of sport is recorded, scenes of the game are generally captured using a plurality of cameras, and editing operations are performed such as appropriately switching between the cameras in accordance with the progress of the game. Finally, video content is produced.

When the video content is reproduced, a guide image representing details such as the score and the names of players may be displayed, as desired, in such a manner that the guide image is superposed on a reproduced video image.

Further editing operations such as reproduction of an impressive scene of actions in a game, for example, scoring a goal in a soccer game, again immediately after the same scene or insertion of shots of the scene at different angles can also be performed and finally video content is produced. Editors can also apply special effects to video files.

Recently, detailed information about the progress of sports games has been electronically created using computer devices and has been presented or accumulated via the Internet or the like. Such information about sports games is called stats.

Stats is information that is manually entered by a stats information input operator using a computer device or a dedicated input device in a stadium where an actual sports game is taking place while the operator is watching the game, such as an ongoing status of the game and the names of players. This information is hereinafter referred to as "stats", "stats information", or "stats data". Stats information allows a viewer to readily obtain the details of, for example, a soccer game, such as which player tried a shot on goal and which player scored a goal.

Japanese Unexamined Patent Application Publication No. 2007-102503 describes an example of the generation of motion data reflecting the motion of players in a video game, which is necessary to execute a video sports game using a gaming device.

SUMMARY OF THE INVENTION

As described above, video content of a recorded sports game is generally edited by an editor to produce video content. The production of video content may involve much labor for editing operations.

In addition, the above-described stats information about a sports match exists irrespective of recorded video of the sports match, and is not generally associated with the recorded video of the sports match. When a sport match is broadcast live, the latest score or a brief progress report may be transmitted via data broadcasting. However, detailed information associated with video content, for example, information about the actions of players, is not generally available.

As disclosed in Japanese Unexamined Patent Application Publication No. 2007-102503, a technique for generating motion data reflecting the motion of players in a sports game is used in virtual video sports games on video gaming devices. However, such a technique is not generally applied to video of recorded real sports games. Much time and effort is devoted to creating a program for playing a sports game on a video gaming device, and such a program is not practically applicable to actual sports games.

It is therefore desirable to associate video of a sports match with detailed information about the match.

In an embodiment of the present invention, video data is obtained by capturing video of a specific area, and the obtained video data is accumulated.

Then, event occurrence data representing an event that has occurred in a video image corresponding to the obtained video data and object specifying data for specifying an object relating to the event are entered. The entered event occurrence data and object specifying data are added to the accumulated video data using a predetermined format through provision of data for linking the video data to the event occurrence data and the object specifying data.

Therefore, the video data, the event occurrence data, and the object specifying data can be linked and accumulated.

According to an embodiment of the present invention, video data, event occurrence data, and object specifying data are linked and accumulated. This facilitates easy retrieval of a video image represented by the event occurrence data and the object specifying data.

For example, when a video sequence of images representing a sports match such as a soccer game is obtained, a video image captured when an event such as a scoring scene during the match occurred can be readily retrieved by referring to the event occurrence data and the object specifying data.

BRIEF DESCRIPTION OF THE DRAWINGS

FIG. 10 is a diagram illustrating an example of data format (example of file header) according to an embodiment of the present invention;

FIG. 11 is a diagram illustrating an example of data format (example of ball position file) according to an embodiment of the present invention;

FIG. 12 is a diagram illustrating an example of data format (example of player position file) according to an embodiment of the present invention;

FIG. 15 is a flowchart illustrating an exemplary video editing process according to an embodiment of the present invention;

FIG. 16 is a flowchart illustrating an exemplary edited video synchronization process according to an embodiment of the present invention;

DESCRIPTION OF THE PREFERRED EMBODIMENTS

Figure 1:
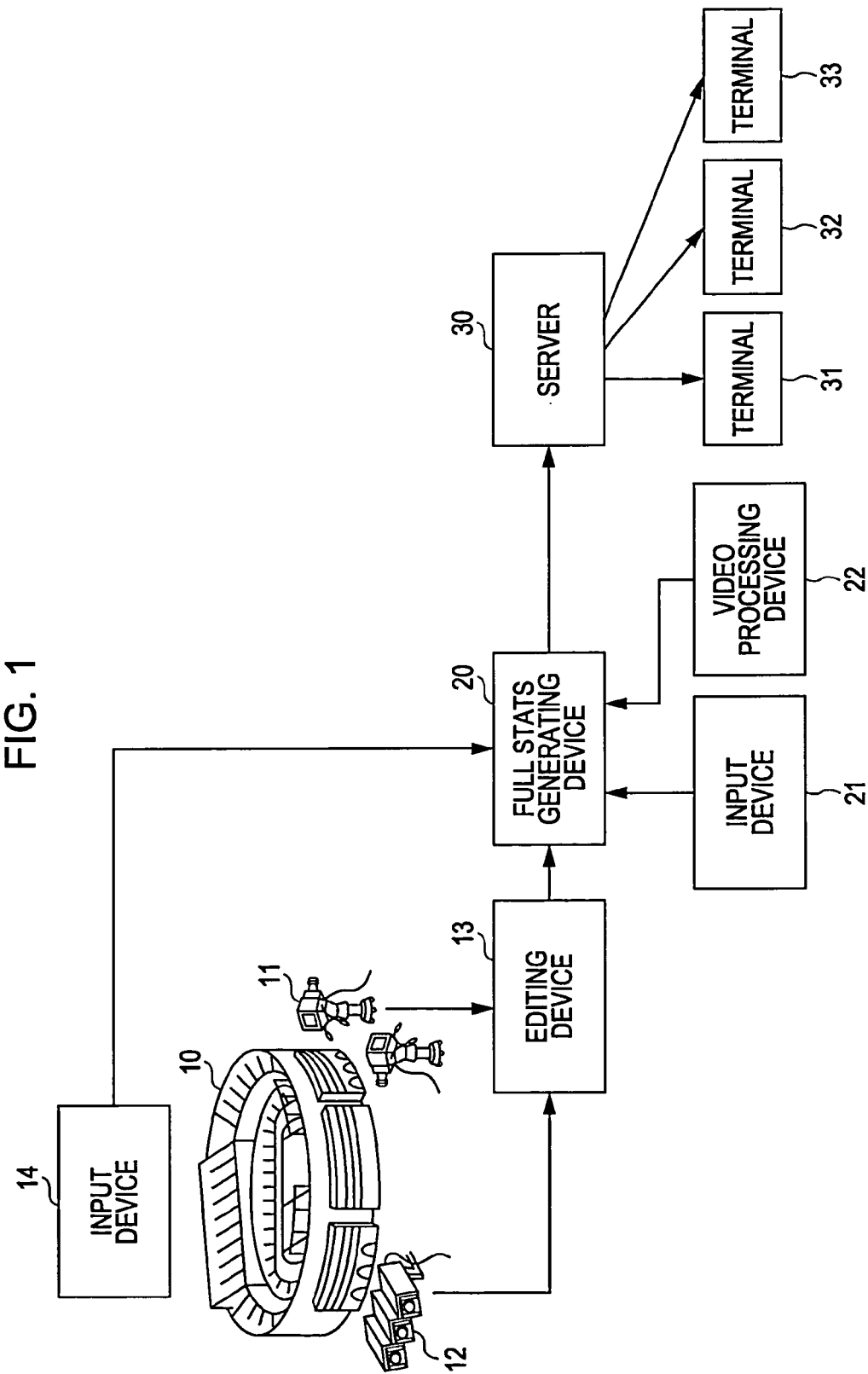
FIG. 1 is a block diagram illustrating an example configuration of a system according to an exemplary embodiment of the present invention.
Figure 2:
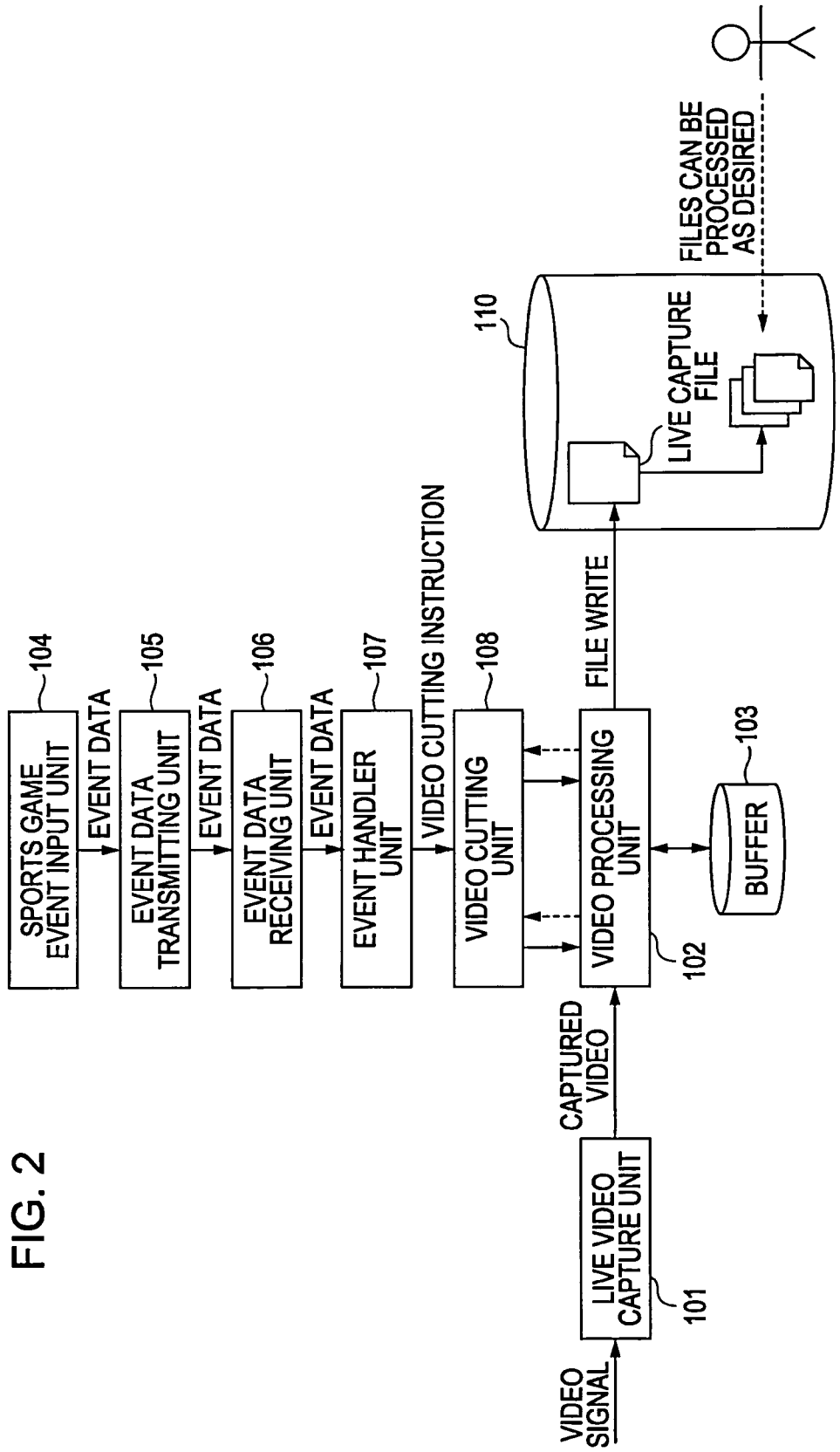
FIG. 2 is a block diagram illustrating an example of a full stats generating device according to an embodiment of the present invention.
Figure 4:
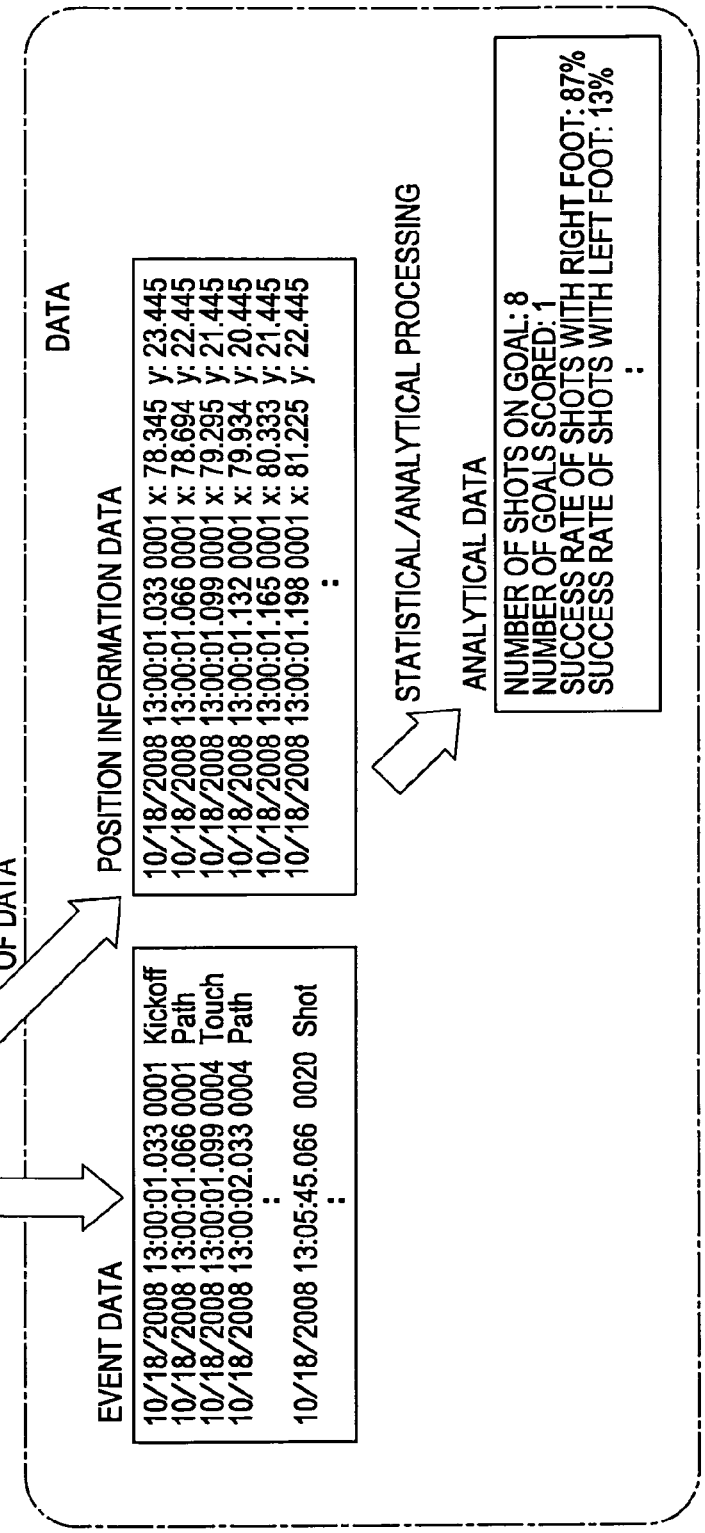
FIG. 4 is a diagram illustrating an example of stats data according to an embodiment of the present invention.

An exemplary embodiment of the present invention will be described hereinafter with reference to the drawings in the following order:

(1) Example Configuration of Overall System: FIG. 1
(2) Example Configuration of Full Stats Generating Device: FIG. 2
(3) Example of Stats Information: FIG. 4
(4) Examples of Data Structure: FIGS. 5 to 14
(5) Exemplary Video Editing Process: FIGS. 15 and 16
(6) Example of Association between Video Image and Meta-Data: FIGS. 17 to 20
(7) Example of Reproduced Video Image: FIGS. 21, 22A, 22B, 23A, and 23B
(1) Example Configuration of Overall System: FIG. 1

First, an example configuration of an overall system according to an exemplary embodiment of the present invention (hereinafter referred to as the present embodiment) will be described with reference to FIG. 1. In the present embodiment, a system configured to capture video of a soccer game using cameras in a soccer stadium and to accumulate the captured video of the soccer game and other data is used by way of example.

In the present embodiment, a plurality of cameras 11 and 12 are placed in a stadium 10 where a sports game takes place, and video of the game is captured using the cameras 11 and 12, and video data of the captured video is supplied to an editing device 13. At least one camera is used to capture video of the entire area of a field where the game takes place in the stadium 10.

Figure 3:
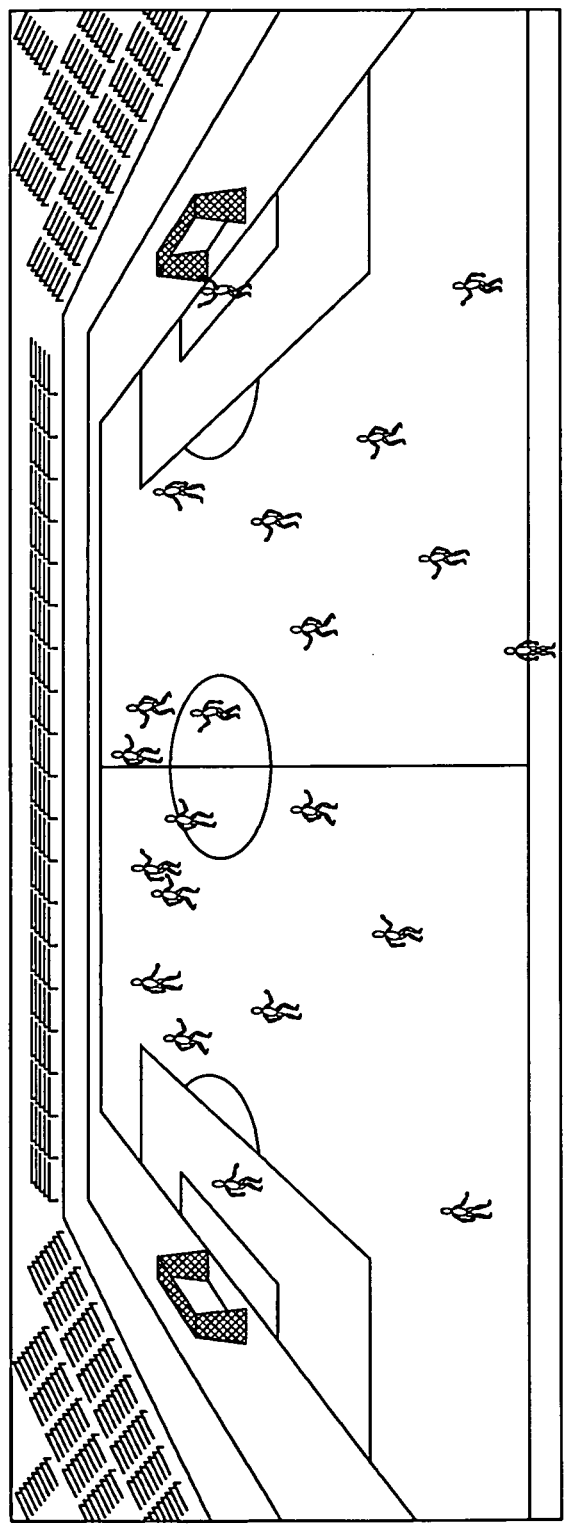
FIG. 3 is a diagram illustrating a captured video image representing the entire area of a field according to an embodiment of the present invention.

For example, as illustrated in FIG. 3, video data captured using a camera located at a fixed position so as to capture a video image representing the entire area of a field in a stadium is obtained. In the example of FIG. 3, it is assumed that video images captured using two cameras placed side by side are connected to form a video image representing the entire area of the field in the stadium.

The editing device 13 performs editing operations on a video sequence of images of the game, such as selection of a video image including a desired scene captured using a camera. The editing device 13 may perform an editing operation at the same time as the capture operation performed in the stadium 10. A video image representing the entire area of the field may be constantly output irrespective of an edited video image.

An input device 14 is also located in the stadium 10. An operator enters stats information, such as the progress of the game, using the input device 14. The input device 14 may be configured by, for example, installing dedicated software into a personal computer device.

The input device 14 is operated by an operator to enter the detailed progress of the game as well as data such as the names of teams taking part in the soccer game, the names of players, and the names of referees. The detailed progress of the game may include, in addition to basic data such as goal scoring, information about the occurrence of events such as a shot on goal, a foul, and a corner kick, together with the names of players involved in the respective events. Information about the rough positions of the players on the field may also be entered if available. The information about the progress of the game may further include the time elapsed since the start of the game or an absolute time.

The above processes may be performed in real time during the game in progress.

The video data edited by the editing device 13 and the stats information entered using the input device 14 are sent to a full stats generating device 20. The operation of the full stats generating device 20 is basically performed after the end of the soccer game which is played in the stadium 10.

The full stats generating device 20 is connected to an input device 21, and receives detailed stats information. The full stats generating device 20 processes the stats information entered using the input device 14 to produce complete stats information (full stats information). If the stats information entered using the input device 14 contains an error, the error is corrected. The input device 21 may also be configured using a computer device.

Examples of the stats information entered using the input device 21 include detailed data that is difficult to enter in real time, such as data on the positions of the players or referees in the field, data on the orientations of the faces of the players or referees, and data on the position of the ball. The above data is generally entered manually by an operator, or may be automatically generated on the basis of captured video of the entire area of the field in the stadium 10.

The full stats generating device 20 is also connected to a video processing device 22, and the video processing device 22 edits a video sequence of images of the game. The editing operation of the video processing device 22 is performed automatically to some extent using the stats information created by the full stats generating device 20.

The stats information created by the full stats generating device 20 and edited video data created by the video processing device 22 are supplied to and accumulated in a server 30. In the server 30, video data and stats information about a single match are accumulated as data on a single piece of video content. When there is audio data attached to the video data, the audio data is also accumulated.

Video content of a soccer game, which is accumulated in the server 30, is delivered to, for example, terminal devices 31, 32, and 33 that have accessed it together with the accompanying stats information. Alternatively, the video content is stored in a certain storage medium and is distributed to users as desired.

(2) Example Configuration of Full Stats Generating Device: FIG. 2

Next, an example configuration of the full stats generating device 20 and peripheral devices will be described with reference to FIG. 2.

A live video capture unit 101 receives video data transmitted from the editing device 13 illustrated in FIG. 1. A video sequence captured by the live video capture unit 101 is supplied to a video processing unit 102 and is accumulated in a buffer 103 as desired.

Data input using a sports game event input unit 104 is sent to an event data transmitting function unit 105. The sports game event input unit 104 and the event data transmitting function unit 105 correspond to the input device 21 illustrated in FIG. 1.

Event data output from the event data transmitting function unit 105 is received by an event data receiving function unit 106, and is sent to an event handler unit 107. The event handler unit 107 sends a video editing instruction to a video cutting unit 108 on the basis of the event data.

In accordance with the instruction from the event handler unit 107, the video cutting unit 108 performs an editing process such as extraction and enlargement of a video image of a specific portion in the video sequence supplied to the video processing unit 102. Video data edited using the video processing unit 102 is accumulated in a storage unit 110. The event data (stats information) received by the event data receiving function unit 106 is also accumulated in the storage unit 110. The video data accumulated in the storage unit 110 may further be edited by the video processing device 22 illustrated in FIG. 1. In FIG. 2, only the processing of event data as stats information is illustrated. Other data such as position information about individual players may also be entered and processed with a processing configuration similar to that described above.

The edited video data and the stats information are transmitted to the server 30 illustrated in FIG. 1.

(3) Example of Stats Information: FIG. 4

Next, an overview of stats information that is added to video data in the system according to the present embodiment will be described with reference to FIG. 4.

As illustrated in FIG. 4, from the beginning of a soccer match until the end of the match, event data and position information data regarding the players, the referees, and the ball are added.

As illustrated in FIG. 4, the event data contains information for each event that has occurred during the match, such as a kickoff, a pass, a touch, or a shot on goal, including the time at which the event occurred, a number for specifying the event, and which player was involved in the event. The position information data may be data indicating the coordinate position of all the players on the field, the referees, and the ball at predetermined time intervals such as per second. The event data and the position data are statistically processed and analyzed, thereby providing an analysis of the details per match, such as the number of shots on goal and the number of goals scored. In the example of FIG. 4, the success rate of shots with the right foot and the success rate of shots with the left foot are calculated. It is to be understood that the data items illustrated in FIG. 4 are merely examples and other detailed analysis can be made using a detailed data structure described below.

(4) Examples of Data Structure: FIGS. 5 to 14

Next, the data structure of the stats information generated by the full stats generating device 20 will be described with reference to FIGS. 5 to 13.

First, an overview of the data structure of the stats information will be described with reference to FIGS. 5 to 9.

Figures 5, 6:
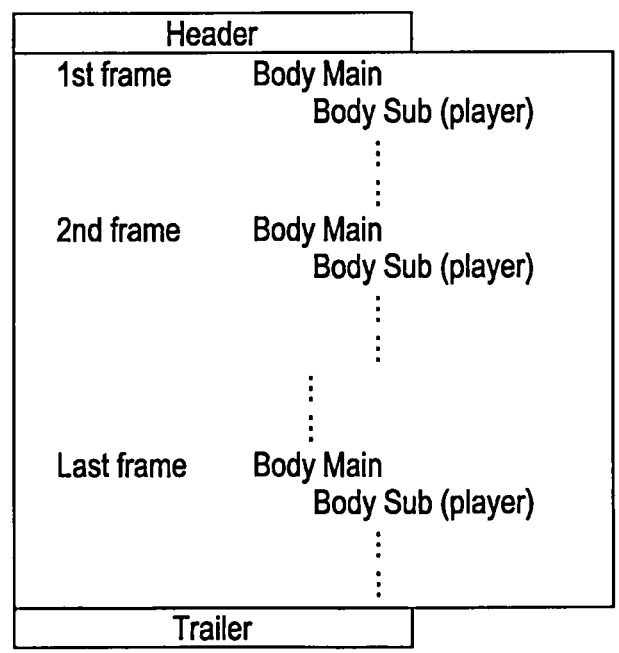
FIG. 5 is a diagram illustrating an example of data format (example of overview format) according to an embodiment of the present invention.
FIG. 6 is a diagram illustrating an example of data format (example of fixed position data) according to an embodiment of the present invention.

In the present embodiment, as illustrated in FIG. 5, the stats information has a data format including a header section, a body section, and a trailer section. The body section contains actual data described below.

FIGS. 6 to 9 illustrate examples of the body section.

FIG. 6 illustrates fixed position data. The fixed position data may be data indicating a fixed position of an individual player on the field in a soccer match. That is, data on a position that is assigned to each player, such as the center forward, is set and arranged player-by-player for each frame. The fixed position data may be data that is basically sufficient to be added once to data for each match unless a player is replaced.

Figure 7:
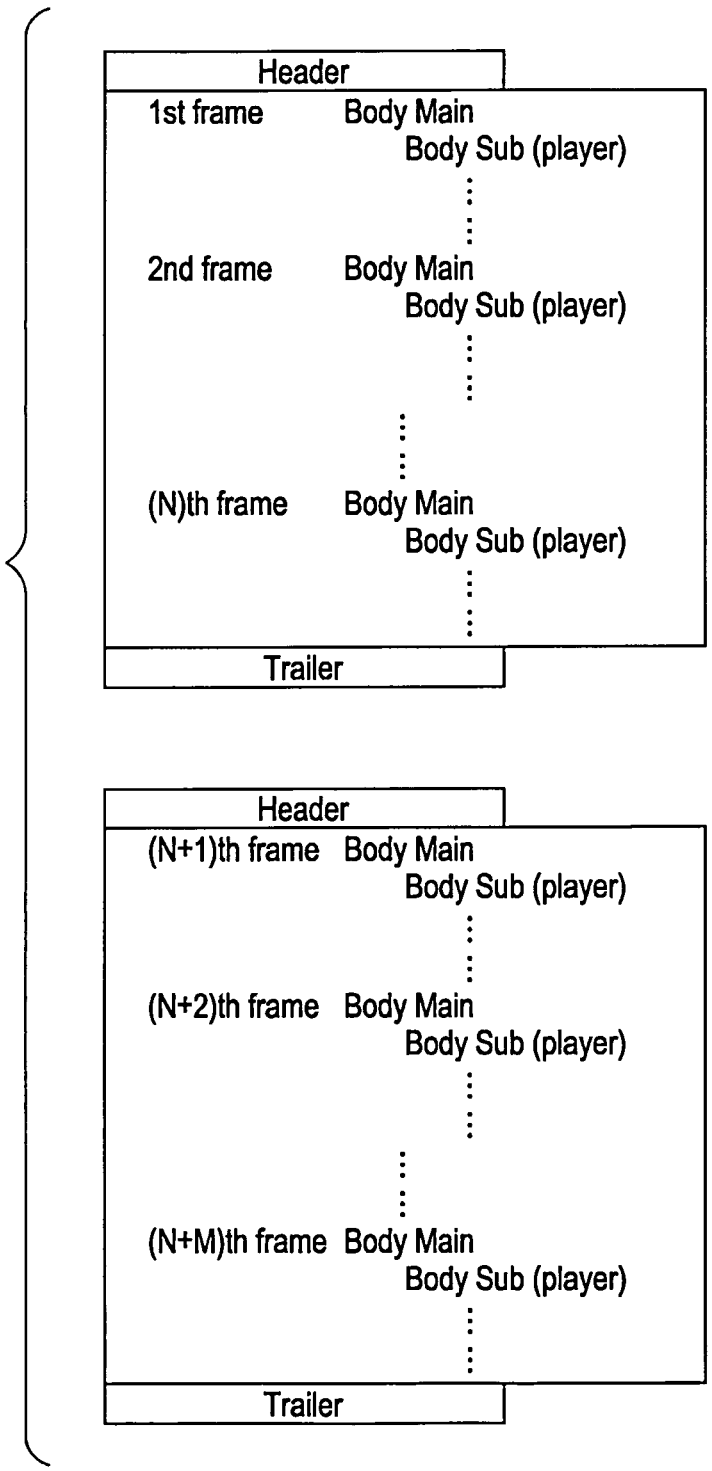
FIG. 7 is a diagram illustrating an example of data format (example of live position data) according to an embodiment of the present invention.

FIG. 7 illustrates live position data. The live position data may be data indicating the coordinate position of all the players on the field, the referees, and the ball at each time step. Here, as illustrated in FIG. 7, a frame number of a video sequence is indicated per unit of live position data, and the positions of the players and the like in the video sequence at the corresponding frame number are indicated. In the most detailed data, therefore, representations per frame are presented. Representations per second may be presented in order to reduce the data amount.

Figure 8:
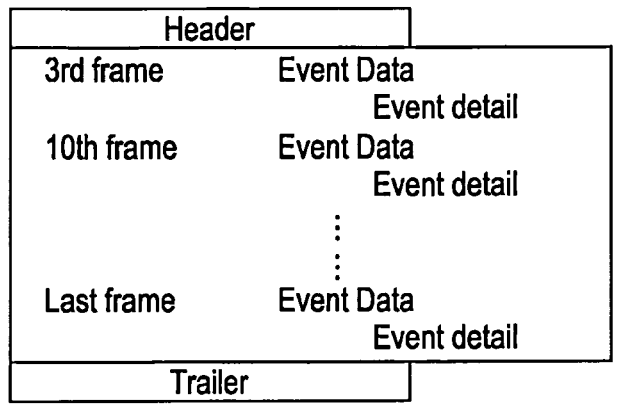
FIG. 8 is a diagram illustrating an example of data format (example of fixed event data) according to an embodiment of the present invention.

FIG. 8 illustrates fixed event data. The fixed event data includes, for each event, the frame number at which the event has occurred and data indicating the details of the event that has occurred. The fixed event data may be data on fixed events that regularly occur during a match, such as the start of the match, the end of the match, and stoppage.

Figure 9:
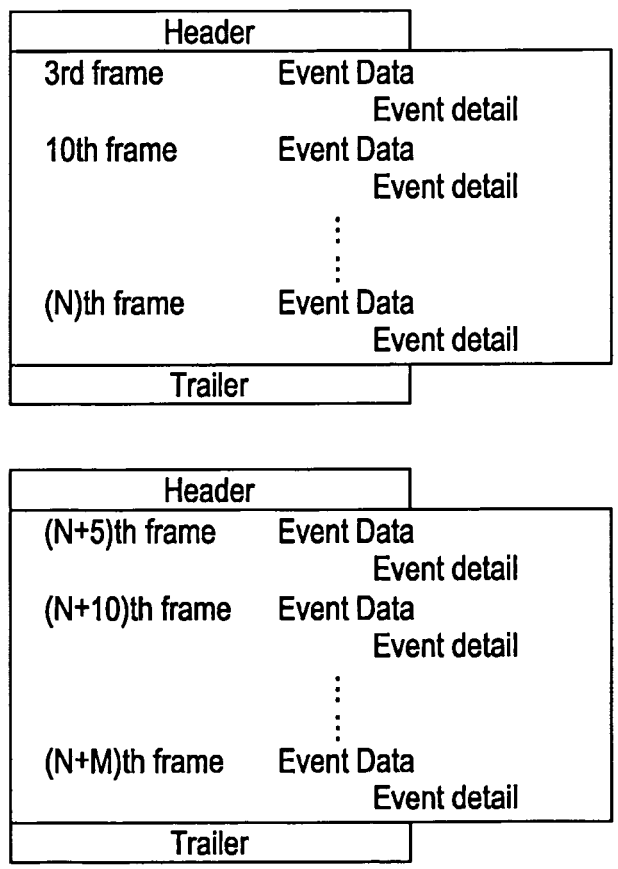
FIG. 9 is a diagram illustrating an example of data format (example of live event data) according to an embodiment of the present invention.

FIG. 9 illustrates live event data. The live event data includes, for each event, the frame number at which the event has occurred and data indicating the details of the event that has occurred. Live events may be events that occur at any time during a match, such as a pass, a touch, a shot on goal, and a corner kick, and data regarding players involved in the events is added in detailed data. The live event data may be data that is continuously generated during a match. As illustrated in FIG. 9, the header and trailer are added to every certain amount of data to form a packet.

Next, a detailed example data configuration of data items will be described with reference to FIGS. 10 to 14. In FIGS. 10 to 14, the data items are represented in units of a predetermined number of bytes.

FIG. 10 illustrates an example of a file header. In the file header, data items indicating a data structure, such as the format type, the format version, and the frame rate, are added at the beginning, followed by the ID of a soccer competition ("competition ID"), the ID of a soccer match ("match ID"), the ID of the home team ("home team ID"), and the ID of the away team ("away team ID"). Other data items such as the horizontal and vertical dimensions of the field (X-direction field size and Y-direction field size) and the number of players are also added.

As illustrated in FIG. 10, the time of the start of the first half, the time of the end of the first half, the time of the start of the second half, the time of the end of the second half, the time of the start of the first half of extra-time, the time of the start of a penalty shootout ("PK start"), and other data items are included. In the illustrated example, the time scale indicator is based on the absolute time or UTC (Universal Time Coordinated) time. A detailed structure of the information about each time stamp is illustrated in the right part of FIG. 10.

FIG. 11 illustrates an example configuration of a ball position file.

The position of the ball during a match is represented in terms of the UTC time, the frame number of video, the X and Y coordinate positions on the field, and the height-direction (Z) coordinate position.

FIG. 12 illustrates an example configuration of a player position file.

The player position file describes, for each player, the X and Y coordinate positions on the field and the height-direction (Z) coordinate position. The position of the face of each player is further represented in terms of the X and Y coordinate positions on the field and the height-direction (Z) coordinate position. The face data of each player may further include data on the orientation of the face of the player.

The player position file further includes detailed data regarding the actions of an individual player, such as a period in which the player moves the foot.

Figures 13, 14:
FIG. 13 is a diagram illustrating an example of data format (example of player event file) according to an embodiment of the present invention.
FIG. 14 is a diagram illustrating an example of data format (example of file trailer) according to an embodiment of the present invention.

FIG. 13 illustrates an example configuration of a player event file.

The player event file contains data on the details of an event that is played by an individual player during a match. The player event file includes a frame number, a player ID, a team ID, a shirt number ("uniform number"), and event data representing the details of an event.

FIG. 14 illustrates the file trailer which describes the total number of events and the number of frames of video.

(5) Exemplary Video Editing Process: FIGS. 15 and 16

FIGS. 15 and 16 are flowcharts illustrating exemplary processes for editing a video sequence on the basis of stats information obtained in the manner described above. FIG. 15 illustrates an example in which an effect that is based on meta-data is superposed when a video image is reproduced, and FIG. 16 illustrates an example in which an effect is generated from meta-data and is superposed when a video image is reproduced. The processing steps in the flowcharts may be automatically performed in, for example, the video processing device 22 illustrated in FIG. 1. Alternatively, for example, an indication for selecting an editing operation on the basis of the stats information may be displayed on a screen that is viewed by an editing operator, and an operator may select an editing operation and determine whether or not the selected editing operation is to be executed. In the flowcharts, the term "meta-information" and "meta-data" correspond to the stats information described above.

First, a wide-angle captured video image representing the entire area of the field (FIG. 3) is reproduced using the video processing device 22 (step S11), and it is determined whether or not meta-information is associated with the current reproduction time (step S12). When meta-information (here, live event data in the stats information) is not associated, the process returns to step S11.

If it is determined in step S12 that meta-information (live event data in the stats information) is associated, an area where the event is occurring in the wide-angle video image is determined on the basis of the coordinate position of the player or players or the ball, which is indicated by the meta-information (step S13). An editing operation (effect) to be applied to the video image is also determined in accordance with the type of the event.

Then, the video image currently being reproduced is edited so as to reflect the determined area and effect (step S14), and edited video data is extracted. Then, the process returns to step S11. Specific examples of the edited video image are described below.

FIG. 16 illustrates an exemplary process for synchronizing the extracted edited video data with the original video image.

First, meta-data is analyzed and an editing operation (effect) is determined (step S21). Then, it is determined whether or not video data has been created by performing the editing operation (effect) (step S22). The process waits for desired video data to have been created. When desired video data is created, a time synchronization process for synchronizing the reproduction time of the wide-angle video image representing the entire area of the field with the reproduction time of the created video image is performed (step S23). By performing the time synchronization process, video content in which the wide-angle video image and the edited video image are reproduced at the same time is created (step S24). Then, the process returns to step S21.

(6) Example of Association between Video Image and Meta-Data: FIGS. 17 to 20

Next, an example of the association between video data of a wide-angle video image and meta-data will be described with reference to FIGS. 17 to 20.

Figure 17:
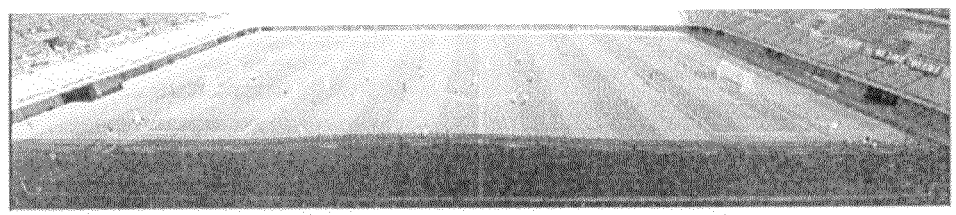
FIG. 17 is a diagram illustrating an example of a video image and meta-data according to an embodiment of the present invention.

For example, as illustrated in FIG. 17, it is assumed that meta-data indicates that a player at position "A-5" made a shot on goal at a certain time.

Figure 18:
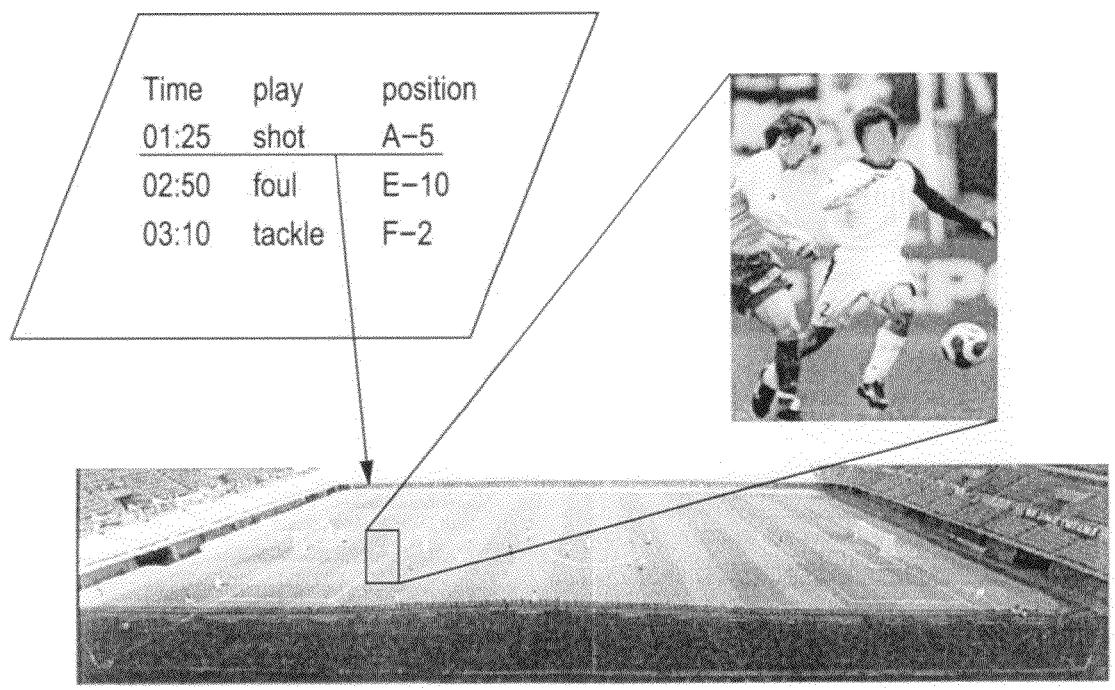
FIG. 18 is a diagram illustrating an example of a video image that is processed under the condition of FIG. 17, in which a portion of a wide-angle video image is zoomed and reproduced.

In this case, as illustrated in FIG. 18, a portion including the player is extracted from the wide-angle video image, and edited video data in which the extracted video image portion is enlarged is created. The enlarged video image portion is presented together with the wide-angle video image.

Figure 19:
FIG. 19 is a diagram illustrating another example of a video image and meta-data according to an embodiment of the present invention.

For example, as illustrated in FIG. 19, it is further assumed that meta-data indicates that a certain player passed the ball to another player at the timing of a certain frame number.

Figure 20:
FIG. 20 is a diagram illustrating an example of a video image that is processed under the condition of FIG. 19.

In this case, as illustrated in FIG. 20, a video image in which the locus of the ball is drawn is created, and the video image showing the locus of the ball is displayed in a manner superposed on the wide-angle video image.

In the illustrated examples, only the wide-angle video image representing the entire area of the field is obtained by way of example. When a video image captured at a different angle can be obtained, the video image captured at the different angle can be used to create edited video data.

(7) Example of Reproduced Video Image: FIGS. 21, 22A, 22B, 23A, and 23B

FIGS. 21, 22A, 22B, 23A, and 23B are diagrams illustrating more specific examples of edited video images.

Figure 21:
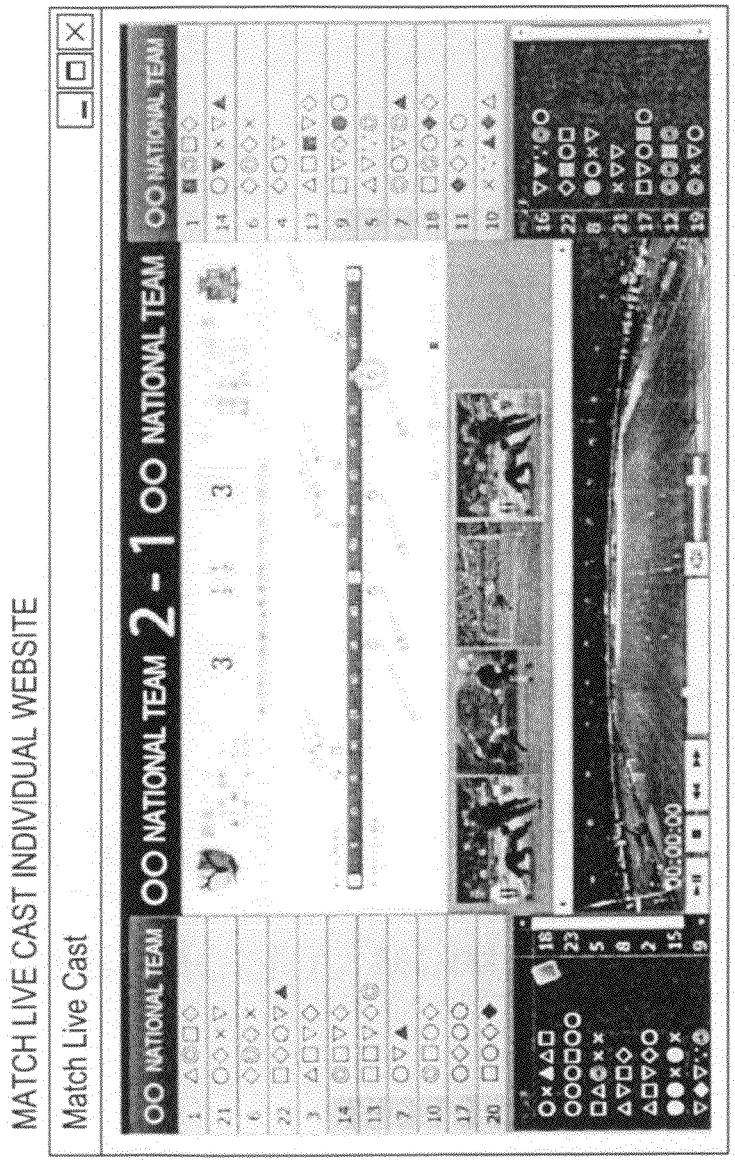
FIG. 21 is a diagram illustrating an example of a reproduced video image according to an embodiment of the present invention.
Figure 22A:
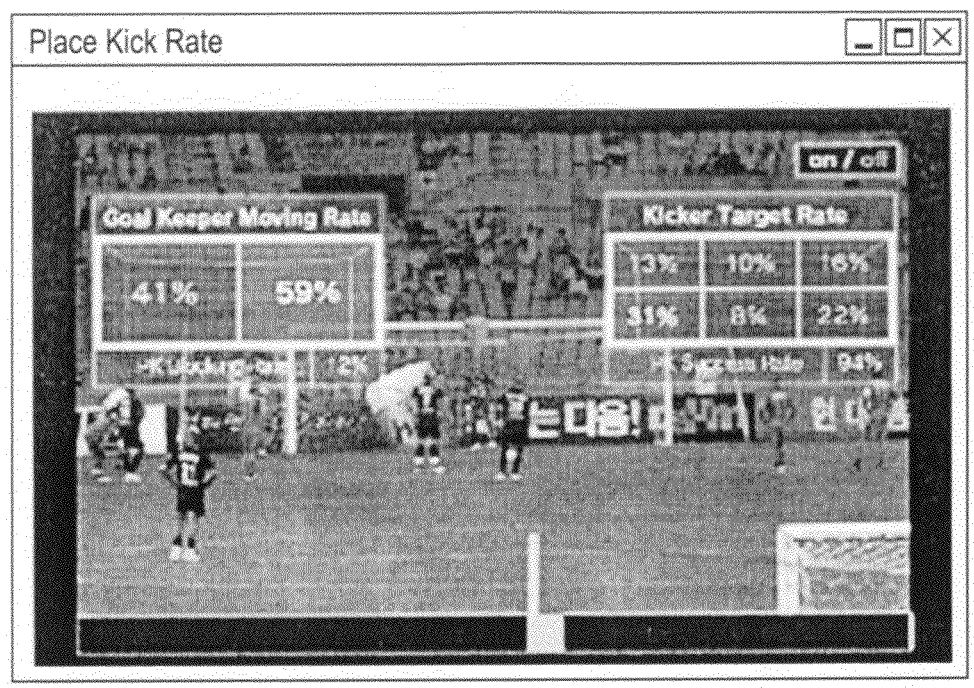
FIGS. 22A and 22B are diagrams illustrating other examples of reproduced video images according to an embodiment of the present invention.
Figure 22B:
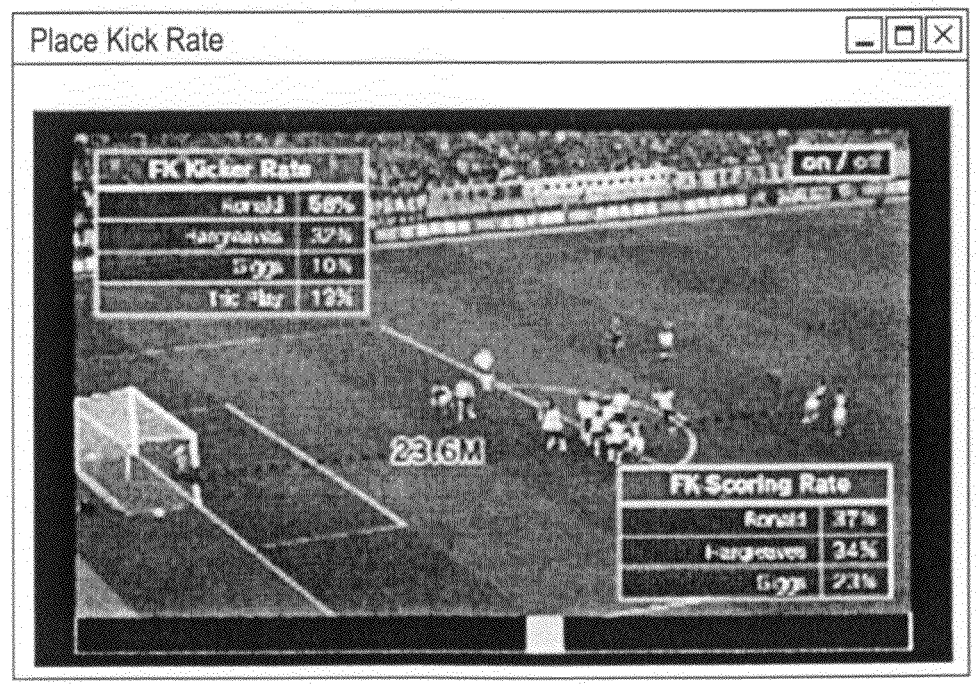
Figure 23A:
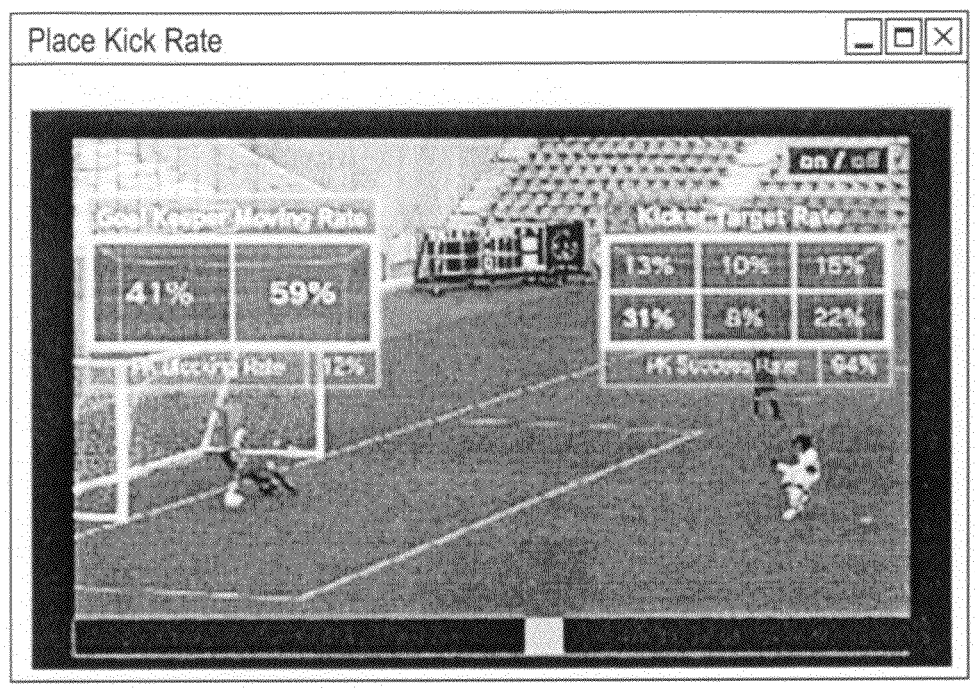
FIGS. 23A and 23B are diagrams illustrating still other examples of reproduced video images according to an embodiment of the present invention.
Figure 23B:
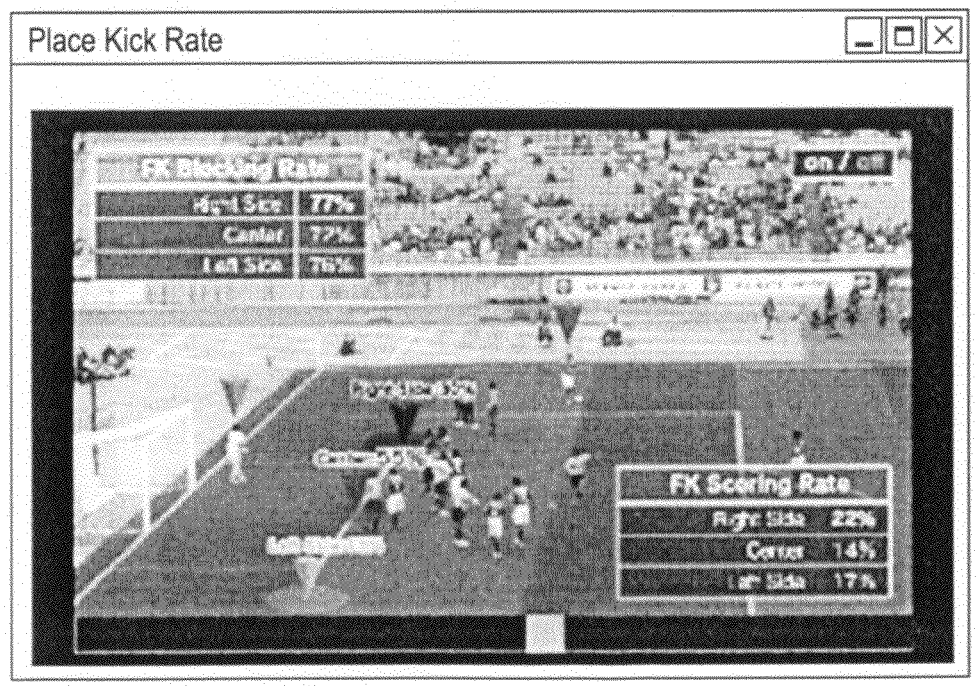

In the example illustrated in FIG. 21, a wide-angle captured video image representing the entire area of the field is located in a lower portion of the screen, and edited video images that are created on the basis of meta-data are located in a portion upper than the wide-angle video image, where scores and a list of names of players are shown in appropriate portions. According to the present embodiment, the above video images can be automatically created through the use of meta-data.

FIGS. 22A, 22B, 23A, and 23B illustrate examples of video images other than a wide-angle video image representing the entire area of the field. In the examples, video images captured at different angles are extracted on the basis of meta-data and edited video images are created. In addition, information obtained by analyzing the meta-data is also superposed using characters and any other suitable items. The video images illustrated in FIGS. 22A, 22B, 23A, and 23B may be presented and reproduced together with the wide-angle video image representing the entire area of the field to create video content.

According to the present embodiment, therefore, a video sequence of captured images of a soccer match and stats information about the soccer match are associated in terms of frame number and absolute time information, and a video image of a specific area is extracted from the video sequence on the basis of the stats information and is edited. Therefore, the video sequence of captured images of the match is integrated with meta-data such as the stats information, and is automatically edited. In this case, the editing area is determined by referring to the meta-data, without detecting an object in the video sequence using image recognition or the like. Therefore, advantageously, high-quality processing can be performed with reduced load for video editing processing.

While in the embodiment described above, a video sequence of images of a soccer match is used by way of example, a video sequence of images of any other sports match can also be used.

In the embodiment described above, video data, data on an event that has occurred in a match, and data for specifying an object (such as a player) in a video sequence of images, which is involved in the event, are linked in terms of frame number of the video sequence. The above data items may be linked using any other data. In the embodiment described above, since UTC data serving as absolute time data is added, the above data items may be linked using the UTC data. Alternatively, the above data items may be linked using the absolute elapsed time from the time of the start of the match or the number of elapsed frames.

The devices illustrated in FIG. 1 may also be configured by incorporating a program for executing the processes described in the embodiment into a computer device (information processing device) so that similar devices can be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. A video processing device comprising:
 a video obtaining unit configured to obtain video data by capturing video of a specific area;
 a video accumulating unit configured to accumulate the video data obtained by the video obtaining unit;
 a data input unit configured to input event occurrence data indicating an event that has occurred in a video image or frame corresponding to the video data obtained by the video obtaining unit and object specifying data for specifying an object relating to the event; and
 an addition processing unit configured to add the event occurrence data and object specifying data input by the data input unit to the video data accumulated in the video accumulating unit using a predetermined format through provision of link data for linking the video data to the event occurrence data and the object specifying data,
 wherein the video data obtained by the video obtaining unit is video data of a recorded actual sports game,
 wherein the object specifying data input by the data input unit includes data of an actual position of a player or players in the sports game, and data of actual movement positions of the player or players during the sports game,
 wherein the video data represents a video sequence of frames, each frame of the video sequence being identified by a respective frame number and having associated therewith the object specifying data of the actual position or positions of the player or players during the actual sports game, and
 wherein the link data is a desired frame number or numbers of the video sequence representative of a desired position or positions in the video sequence which correspond to a desired event or events.

2. A video processing method comprising the steps of:
 obtaining video data by capturing video of a specific area;
 accumulating the video data obtained in the step of obtaining;
 inputting event occurrence data indicating an event that has occurred in a video image or frame corresponding to the video data obtained in the step of obtaining and object specifying data for specifying an object relating to the event; and
 adding the event occurrence data and object specifying data input in the step of inputting to the video data accumulated in the step of accumulating using a predetermined format through provision of link data for linking the video data to the event occurrence data and the object specifying data,
 wherein the video data obtained by the obtaining step is video data of a recorded actual sports game,
 wherein the object specifying data inputted by the inputting step includes data of an actual position of a player or players in the sports game, and data of actual movement positions of the player or players during the sports game,
 wherein the video data represents a video sequence of frames, each frame of the video sequence being identified by a respective frame number and having associated therewith the object specifying data of the actual position or positions of the player or players during the actual sports game, and
 wherein the link data is a desired frame number or numbers of the video sequence representative of a desired position or positions in the video sequence which correspond to a desired event or events.

3. A program for causing an information processing device to execute the steps of:
 obtaining video data by capturing video of a specific area;
 accumulating the video data obtained in the step of obtaining;
 inputting event occurrence data indicating an event that has occurred in a video image or frame corresponding to the video data obtained in the step of obtaining and object specifying data for specifying an object relating to the event; and
 adding the event occurrence data and object specifying data input in the step of inputting to the video data accumulated in the step of accumulating using a predetermined format through provision of link data for linking the video data to the event occurrence data and the object specifying data,
 wherein the video data obtained by the obtaining step is video data of a recorded actual sports game,
 wherein the object specifying data inputted by the inputting step includes data of an actual position of a player or players in the sports game, and data of actual movement positions of the player or players during the sports game,
 wherein the video data represents a video sequence of frames, each frame of the video sequence being identified by a respective frame number and having associated therewith the object specifying data of the actual position or positions of the player or players during the actual sports game, and wherein the link data is a desired frame number or numbers of the video sequence representative of a desired position or positions in the video sequence which correspond to a desired event or events.

* * * * *